(12) United States Patent
Kato

(10) Patent No.: US 12,033,344 B2
(45) Date of Patent: Jul. 9, 2024

(54) SHAPE DETECTION METHOD, SHAPE DETECTION SYSTEM, AND PROGRAM

(71) Applicant: LINKWIZ INCORPORATED, Hamamatsu (JP)

(72) Inventor: Akihide Kato, Hamamatsu (JP)

(73) Assignee: LINKWIZ INCORPORATED, Hamamatsu (JP)

( * ) Notice: Subject to any disclaimer, the term of this patent is extended or adjusted under 35 U.S.C. 154(b) by 349 days.

(21) Appl. No.: 17/600,512

(22) PCT Filed: Jan. 27, 2021

(86) PCT No.: PCT/JP2021/002877
§ 371 (c)(1),
(2) Date: Sep. 30, 2021

(87) PCT Pub. No.: WO2021/157446
PCT Pub. Date: Aug. 12, 2021

(65) Prior Publication Data
US 2022/0164975 A1 May 26, 2022

(30) Foreign Application Priority Data
Feb. 5, 2020 (JP) ................. 2020-018325

(51) Int. Cl.
G06T 7/64 (2017.01)
G06T 7/50 (2017.01)
G06T 7/62 (2017.01)
(52) U.S. Cl.
CPC .............. G06T 7/64 (2017.01); G06T 7/50 (2017.01); G06T 7/62 (2017.01); G06T 2207/10028 (2013.01)

(58) Field of Classification Search
CPC .......... G06T 2207/10028; G06T 17/00; G06T 2210/56; G06T 7/11; G06T 15/00;
(Continued)

(56) References Cited

U.S. PATENT DOCUMENTS

2004/0041805 A1* 3/2004 Hayano ................... G06T 17/00
345/419
2016/0253836 A1* 9/2016 Unten ..................... G06T 15/00
345/420
(Continued)

FOREIGN PATENT DOCUMENTS

CN 103534554 A 1/2014
CN 111860060 A * 10/2020 ......... G06K 9/00624
(Continued)

OTHER PUBLICATIONS

Second Notice of Reasons for Refusal dated Aug. 24, 2022 for related Chinese patent application No. 202180002343X.
(Continued)

Primary Examiner — Ian L Lemieux
Assistant Examiner — Woo C Rhim

(57) ABSTRACT

To easily and quickly detect a predetermined shape on an object. A shape detection method for detecting the shape of an object, the method comprising: a step of acquiring data indicating three-dimensional point group data from the object by a sensor, a step of displaying the three-dimensional point group data in a display area of a terminal, a step of acquiring the display area in which the three-dimensional point group data is displayed, as two-dimensional image data, and a step of performing image analysis on the two-dimensional image data, and detecting a predetermined shape of the object.

20 Claims, 8 Drawing Sheets

(58) Field of Classification Search
CPC ........... G06T 7/0004; G06T 7/64; G06T 7/50; G06T 7/62; G06T 7/60; G06T 7/0002; G06T 7/90; G06V 20/64; G06V 2201/07; G06V 10/757; G06V 10/46; G06V 2201/12; G01B 11/24
See application file for complete search history.

(56) References Cited

U.S. PATENT DOCUMENTS

| | | | |
|---|---|---|---|
| 2018/0082472 A1* | 3/2018 | Morikawa | G06T 19/20 |
| 2018/0091802 A1* | 3/2018 | Morikawa | H04N 13/351 |
| 2018/0253821 A1* | 9/2018 | Komeichi | G06T 7/33 |
| 2018/0295289 A1* | 10/2018 | Taya | H04N 23/64 |
| 2019/0253639 A1* | 8/2019 | Takama | G06T 15/20 |
| 2019/0392205 A1* | 12/2019 | Tang | G06V 7/55 |
| 2020/0380272 A1* | 12/2020 | Shu | G06V 10/82 |
| 2021/0039257 A1* | 2/2021 | Tonogai | B25J 9/1697 |
| 2021/0192705 A1* | 6/2021 | Lee | G01B 5/12 |
| 2022/0027654 A1* | 1/2022 | Iwami | G06V 20/00 |
| 2022/0415063 A1* | 12/2022 | Bai | G06V 10/774 |

FOREIGN PATENT DOCUMENTS

| | | | |
|---|---|---|---|
| JP | 2002277241 A | | 9/2002 |
| JP | 2004012221 A | | 1/2004 |
| JP | 2005208868 A | * | 8/2005 |
| JP | 2012015786 A | * | 1/2012 |
| JP | 2014137244 A | | 7/2014 |
| JP | 2017197942 A | * | 11/2017 |
| JP | 2017197942 A | | 11/2017 |

OTHER PUBLICATIONS

Notice of Reasons for Refusal dated Mar. 5, 2020 for related Japanese Patent Application No. 2020-018325.
Notice of Reasons for Refusal dated Jun. 25, 2020 for related Japanese Patent Application No. 2020-093165.
International Search Report dated Apr. 27, 2021 for related International patent Application No. PCT/JP2021/002877.
European search report dated Feb. 5, 2024 for European patent Application No. 21750625.2.
Guang Pang, "3D Point Cloud Object Detection with Multi-View Convolutional Neural Network", 2016 23rd International Conference on Pattern Recognition; Dec. 4-8, 2016; Cancun, Mexico; pp. 585-590.
J. Su et al., "Detection, classification and estimation of individual shapes in 2D and 3D point clouds", Computational Statistics and Data Analysis; Sep. 25, 2012; pp. 227-241.

* cited by examiner

SHAPE DETECTION METHOD, SHAPE DETECTION SYSTEM, AND PROGRAM

TECHNICAL FIELD

The present invention relates to a shape detection method, a shape detection system, and a program.

BACKGROUND ART

Traditionally, as a method of detecting the shape of an object, a contact type or a contactless type shape detection method has existed. (See Patent Literature 1 for example.)

PRIOR ART LITERATURE LIST

[Patent Literature]
[Patent Literature 1] Japanese Unexamined Patent Publication No. 2015-135276

SUMMARY OF THE INVENTION

Technical Problem

However, in a conventional shape detection method, it is easy to detect the entire shape, but it is difficult to find a predetermined shape on the object. For example, even if a predetermined shape can be visually confirmed using a three-dimensional model or the three-dimensional model itself can be directly analyzed, in the former case, the load is large in terms of labor or time of an operator, and there is a possibility that confirmation of the predetermined shape may be omitted, and in the latter case, the load of the analysis processing of a terminal used for analysis is large, so that they cannot be said to be a simple and quick method.

The present invention has been made in view of such a background, and an object of the present invention is to provide a technique capable of easily and quickly detecting a predetermined shape on an object.

Technical Solution

The main invention of the present invention for achieving the above object is a shape detection method for detecting the shape of an object, the method comprising: a step of acquiring data indicating a three-dimensional point group data from the object by a sensor, a step of displaying the three-dimensional point group data in a display area of a terminal, a step of acquiring the display area, in which the three-dimensional point group data is displayed, as two-dimensional image data, and a step of performing image analysis to determine a predetermined shape in the two-dimensional image data and detecting the predetermined shape in the object.

Other problems disclosed in the present application and technical solutions thereof will be clarified in the embodiments of the invention and the accompanying figures.

Advantageous Effects

According to the present invention, a predetermined shape on an object can be detected easily and quickly.

DETAILED DESCRIPTION OF THE EMBODIMENTS

Figure 1:
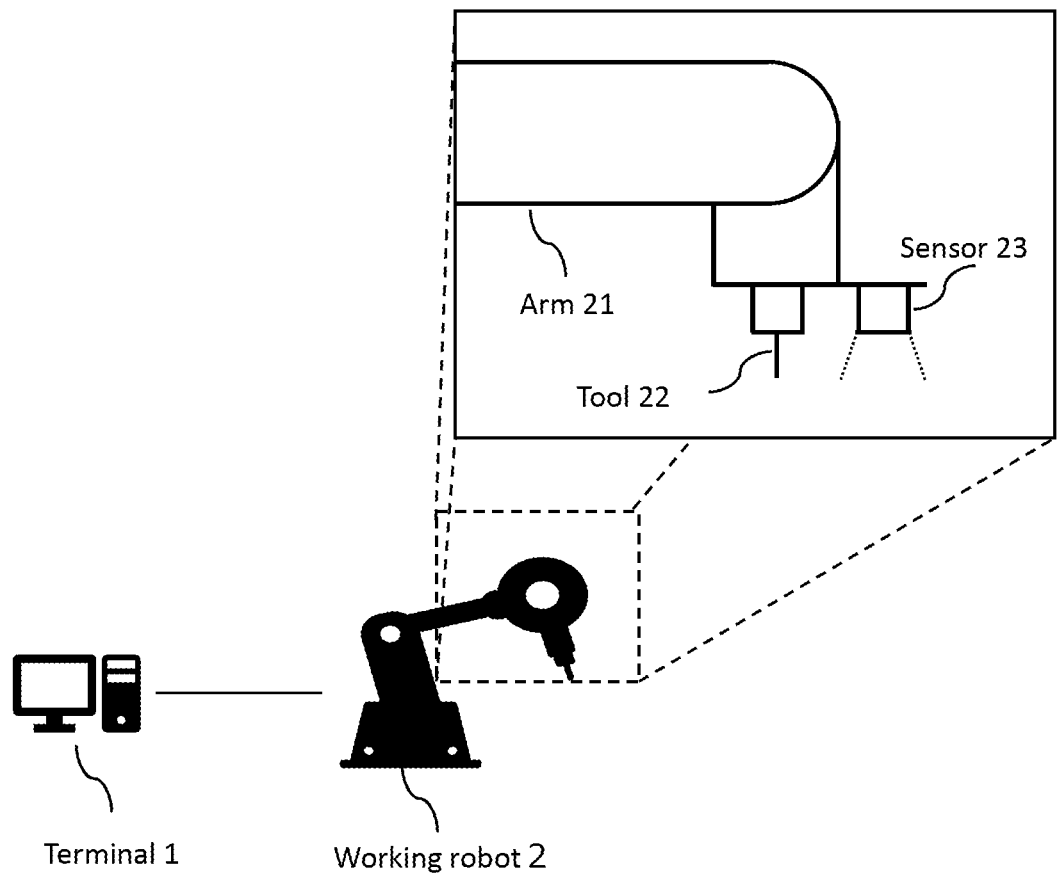
FIG. 1 is showing an overall configuration example of a shape detection system 100 of the present embodiment.

The contents of the embodiment of the present invention will be listed and described. The present invention has the following configuration.

[Item 1]

A shape detection method for detecting the shape of an object, the method comprising: a step of acquiring data indicating a three-dimensional shape from the object by a sensor, a three-dimensional data display step of generating display data based on the data indicating the three-dimensional shape and displaying the display data in a display area of a terminal, a step of acquiring the display data as two-dimensional image data, a step of performing image analysis on the two-dimensional image data and detecting a predetermined shape of the object under a predetermined condition by the image analysis, wherein the predetermined condition is that the size or length of a predetermined feature point in the two-dimensional image data is equal to or larger than a predetermined value.

[Item 2]

A shape detection method for detecting the shape of an object, the method comprising: a step of acquiring data indicating three-dimensional point group data from the object by a sensor, a step of displaying the three-dimensional point group data in a display area of a terminal, a step of acquiring the display area, in which the three-dimensional point group data is displayed, as two-dimensional image data, and a step of performing image analysis on the two-dimensional image data, and detecting a predetermined shape of the object by the image analysis, wherein the method further comprises a step of storing the size of the display area when acquiring the two-dimensional image data.

[Item 3]

A shape detection method for detecting the shape of an object, the method comprising: a step of acquiring data indicating three-dimensional point group data from the object by a sensor, a step of displaying the three-dimensional point group data in a display area of a terminal, a step of acquiring the display area, in which the three-dimensional point group data is displayed, as two-dimensional image data, and a step of performing image analysis on the two-dimensional image data and detecting a predetermined shape of the object by the image analysis, wherein the method further comprises a step of prohibiting a change in the size of the display area after acquiring the two-dimensional image data.

[Item 4]

A shape detection method for detecting the shape of an object, the method comprising: a step of acquiring data indicating three-dimensional point group data from the object by a sensor, a step of displaying the three-dimensional point group data in a display area of a terminal, a step of acquiring the display area, in which the three-dimensional point group data is displayed based on the virtual user position specified by a user, as two-dimensional image data, a step of performing image analysis on the two-dimensional image data and acquiring the image analysis result obtained by detecting a predetermined shape in the object by the image analysis; and a step of comparing the image analysis result with the standard image analysis result to determine whether the image analysis result satisfies the standard.

[Item 5]

A shape detection method for detecting the shape of an object, the method comprising: a step of acquiring data indicating three-dimensional point group data from the object by a sensor, a step of displaying the three-dimensional point group data in a display area of a terminal, a step of acquiring the display area, in which the three-dimensional point group data is displayed, as two-dimensional image data, and a step of performing image analysis to determine a predetermined shape in the two-dimensional image data and detecting the predetermined shape in the object.

[Item 6]

The shape detection method as set forth in Item 5, wherein: the two-dimensional coordinate of the two-dimensional image data is correlated with the three-dimensional coordinate of the three-dimensional point group data, and the method further comprises a step of displaying the position of the detected predetermined shape in the display area so as to be graspable on the three-dimensional data of the object.

[Item 7]

The shape detection method as set forth in Item 5 or 6, which further comprises a step of storing the size of the display area when acquiring the two-dimensional image data.

[Item 8]

The shape detection method as set forth in any one of Items 5 to 7, which further comprises a step of prohibiting a change in the size of the display area after acquiring the two-dimensional image data.

[Item 9]

The shape detection method as set forth in any one of Items 5 to 8, wherein the predetermined shape is a concave shape of the object.

[Item 10]

The shape detection method as set forth in any one of Items 5 to 9, wherein the predetermined shape is a convex shape of the object.

[Item 11]

The shape detection method as set forth in any one of Items 5 to 10, wherein the object is an overlap of two or more components, and the predetermined shape is a boundary shape between the components.

[Item 12]

The shape detection method as set forth in any one of Items 5 to 11, which measures the length between arbitrary positions on the two-dimensional image data.

[Item 13]

A shape detection system for detecting the shape of an object, the system comprising: a three-dimensional data acquisition unit that acquires data indicating a three-dimensional shape from the object by a sensor, a three-dimensional data display unit that generates display data based on the data indicating the three-dimensional shape and displays the display data in a display area of a terminal, a two-dimensional image data acquisition unit that acquires the display data as two-dimensional image data, and an image analysis unit that performs image analysis on the two-dimensional image data and detects a predetermined shape of the object under a predetermined condition by the image analysis, wherein the predetermined condition is that the size or length of a predetermined feature point in the two-dimensional image data is equal to or larger than a predetermined value.

[Item 14]

A shape detection system for detecting the shape of an object, the system comprising: a three-dimensional point group data acquisition unit that acquires three-dimensional point group data from the object by a sensor, a three-dimensional point group data display unit that displays the three-dimensional point group data in a display area of a terminal, a two-dimensional image data acquisition unit that acquires the display area, in which the three-dimensional point group data is displayed, as two-dimensional image data, and an image analysis unit that performs image analysis on the two-dimensional image data and detects a predetermined shape of the object by the image analysis, wherein the system stores the size of the display area when acquiring the two-dimensional image data.

[Item 15]

A shape detection system for detecting the shape of an object, the system comprising: a three-dimensional point group data acquisition unit that acquires three-dimensional point group data from the object by a sensor, a three-dimensional point group data display unit that displays the three-dimensional point group data in a display area of a terminal, a two-dimensional image data acquisition unit that acquires the display area, in which the three-dimensional point group data is displayed, as a two-dimensional image data, and an image analysis unit that performs image analysis on the two-dimensional image data and detects a predetermined shape of the object by the image analysis, wherein the system prohibits a change in the size of the display area after acquiring the two-dimensional image data.

[Item 16]

A shape detection system for detecting the shape of an object, the system comprising: a three-dimensional point group data acquisition unit that acquires three-dimensional point group data from the object by a sensor, a three-dimensional point group data display unit that displays the three-dimensional point group data in a display area of a terminal, a two-dimensional image data acquisition unit that acquires the display area, in which the three-dimensional point group data is displayed based on the virtual user position specified by a user, as two-dimensional image data, and an image analysis unit that acquires an image analysis result obtained by performing image analysis on the two-dimensional image data, and detecting a predetermined shape in the object by the image analysis, wherein the system compares the image analysis result with the standard image analysis result to determine whether the image analysis result satisfies the standard.

[Item 17]

A shape detection system for detecting the shape of an object, the system comprising: a three-dimensional point group data acquisition unit that acquires three-dimensional point group data from the object by a sensor, a three-dimensional point group data display unit that displays the three-dimensional point group data in a display area of a terminal, a two-dimensional image data acquisition unit that acquires the display area, in which the three-dimensional point group data is displayed, as a two-dimensional image data, and an image analysis unit that performs image analysis to determine a predetermined shape in the two-dimensional image data and detects the predetermined shape in the object.

[Item 18]

A program for making a computer execute a shape detection method for detecting the shape of an object, the program making the computer execute, as the shape detection method, comprising: a step of acquiring data indicating a three-dimensional shape from the object by a sensor, a step of generating display data based on the data indicating the three-dimensional shape and displaying the display data on a display area of a terminal, a step of acquiring the display data as two-dimensional image data, and a step of performing image analysis on the two-dimensional image data and detecting a predetermined shape of the object under a predetermined condition by the image analysis, wherein the predetermined condition is that the size or length of a predetermined feature point in the two-dimensional image data is equal to or larger than a predetermined value.

[Item 19]

A program for making a computer execute a shape detection method for detecting the shape of an object, the program making the computer execute, as the shape detection method, comprising: a step of acquiring data indicating three-dimensional point group data from the object by a sensor, a step of displaying the three-dimensional point group data in a display area of a terminal, a step of acquiring the display area in which the three-dimensional point group data is displayed, as two-dimensional image data, and a step of performing image analysis on the two-dimensional image data and detecting a predetermined shape of the object by the image analysis, wherein the program further makes the computer execute a step of storing the size of the display area when acquiring the two-dimensional image data.

[Item 20]

A program for making a computer execute a shape detection method for detecting the shape of an object, the program making the computer execute, as the shape detection method, comprising: a step of acquiring data indicating three-dimensional point group data from the object by a sensor, a step of displaying the three-dimensional point group data in a display area of a terminal, a step of acquiring the display area, in which the three-dimensional point group data is displayed, as two-dimensional image data, and a step of performing image analysis on the two-dimensional image data and detecting a predetermined shape of the object by the image analysis, wherein the program further makes the computer execute a step of prohibiting a change in the size of the display area after acquiring the two-dimensional image data.

[Item 21]

A program for making a computer execute a shape detection method for detecting the shape of an object, the program making the computer execute, as the shape detection method, comprising: a step of acquiring data indicating three-dimensional point group data from the object by a sensor, a step of displaying the three-dimensional point group data in a display area of a terminal, a step of acquiring a display area, in which the three-dimensional point group data is displayed based on the virtual user position specified by a user, as two-dimensional image data, a step of acquiring an image analysis result obtained by performing image analysis on the two-dimensional image data, and detecting a predetermined shape in the object by the image analysis, and a step of comparing the image analysis result with the standard image analysis result to determine whether the image analysis result satisfies the standard.

[Item 22]

A program for making a computer execute a shape detection method for detecting the shape of an object, the program making the computer execute, as the shape detection method, comprising: a step of acquiring data indicating three-dimensional point group data from the object by a sensor, a step of displaying the three-dimensional point group data in a display area of a terminal, a step of acquiring the display area, in which the three-dimensional point group data is displayed, as two-dimensional image data, and a step of performing image analysis to determine a predetermined shape in the two-dimensional image data and detecting the predetermined shape in the object.

DETAILS OF EMBODIMENTS

Specific examples of the shape detection system 100 according to an embodiment of the present invention will be described below with reference to the accompanying drawings. Also, it should be noted that the present invention is not limited to these examples, but expressed by the scope of claims, which are intended to include all alterations within the implication and scope equivalent to those of the claims of the patent. In the following description, the same or similar reference numerals and names in the accompanying drawings refer to the same or similar elements, and in the description of each embodiment, duplicate description of the same or similar elements may be omitted. In addition, the features shown in each embodiment can be applied to other embodiments as long as they do not contradict each other.

FIG. 1 is showing an overall configuration example of a shape detection system 100 of the present embodiment. As shown in FIG. 1, the shape detection system 100 of the present embodiment includes a terminal 1 and a working robot 2. The working robot 2 has at least an arm 21, a tool 22, and a sensor 23. The terminal 1 and the working robot 2 are connected to communicate with each other by wire or wireless.

<Terminal 1>

Figure 2:
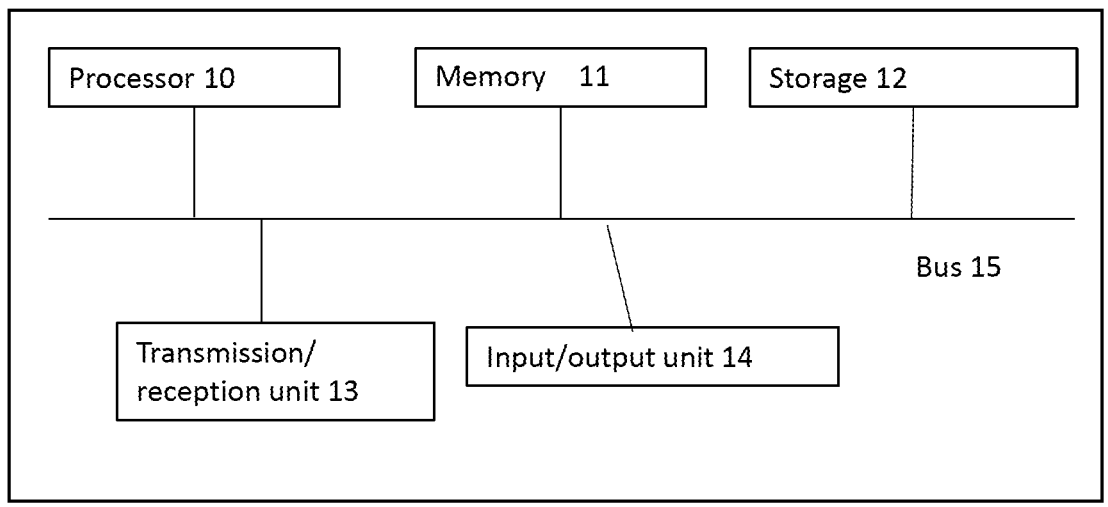
FIG. 2 is showing a hardware configuration example of a terminal 1 according to the present embodiment.

FIG. 2 is a diagram showing a hardware configuration example of a terminal 1. The terminal 1 may be a general-purpose computer such as a personal computer, or may be logically implemented by cloud computing. Further, the illustrated configuration is an example, and may have other configurations.

The terminal 1 includes at least a processor 10, a memory 11, a storage 12, a transmission/reception unit 13, an input/output unit 14, and the like, and these are electrically connected to each other through a bus 15.

The processor 10 is an arithmetic unit that controls the operation of the entire terminal 1, at least controls the transmission and reception of data and the like to the working robot 2, and performs information processing required for application execution and authentication processing. For example, the processor 10 is a CPU (central processing unit) and/or a GPU (graphics processing unit). Each information processing is performed by executing a program or the like for this system stored in the storage 12 and expanded on the memory 11.

The memory 11 includes a main memory composed of a volatile storage device such as a DRAM (dynamic random access memory) and an auxiliary memory composed of a non-volatile storage device such as a flash memory or an HDD (hard disk drive). The memory 11 is used as a work area or the like of the processor 10, and also stores a BIOS (basic input/output system) executed when the terminal 1 is started, and various setting information, and the like.

The storage 12 stores various programs such as application programs. A database having data stored thereon used for each processing may be constructed in the storage 12.

The transmission/reception unit 13 connects the terminal 1 to at least the working robot 2 and performs data transmission and reception, and the like according to the instructions of the processor. Further, the transmission/reception unit 13 is configured by wire or wireless, and in the case of wireless, for example, it may be configured by a short-range communication interface of WiFi, Bluetooth (registered trademark), and BLE (Bluetooth Low Energy).

The input/output unit 14 is an information input device such as a keyboard and a mouse, and an output device such as a display.

The bus 15 is commonly connected to the above each element and transmits, for example, an address signal, a data signal, and various control signals.

<Working Robot 2>

Returning to FIG. 1, the working robot 2 according to the present embodiment will be described.

As described above, the working robot 2 has the arm 21, the tool 22, and the sensor 23. The illustrated configuration is an example, and may have other configurations.

The arm 21 controls its operation by the terminal 1 based on the three-dimensional robot coordinate system. Further, the arm 21 may further include a controller (not shown) connected to the working robot 2 by wire or wireless, thereby controlling the operation thereof.

The tool 22 controls its operation by the terminal 1 based on the three-dimensional tool coordinate system. Further, the configuration of the tool 22 may include any tool in accordance with applications, and may be, for example, a welding torch, a paint spraying device for paint, a gripping device, an excavation device, a polishing device, or the like.

Figure 4:
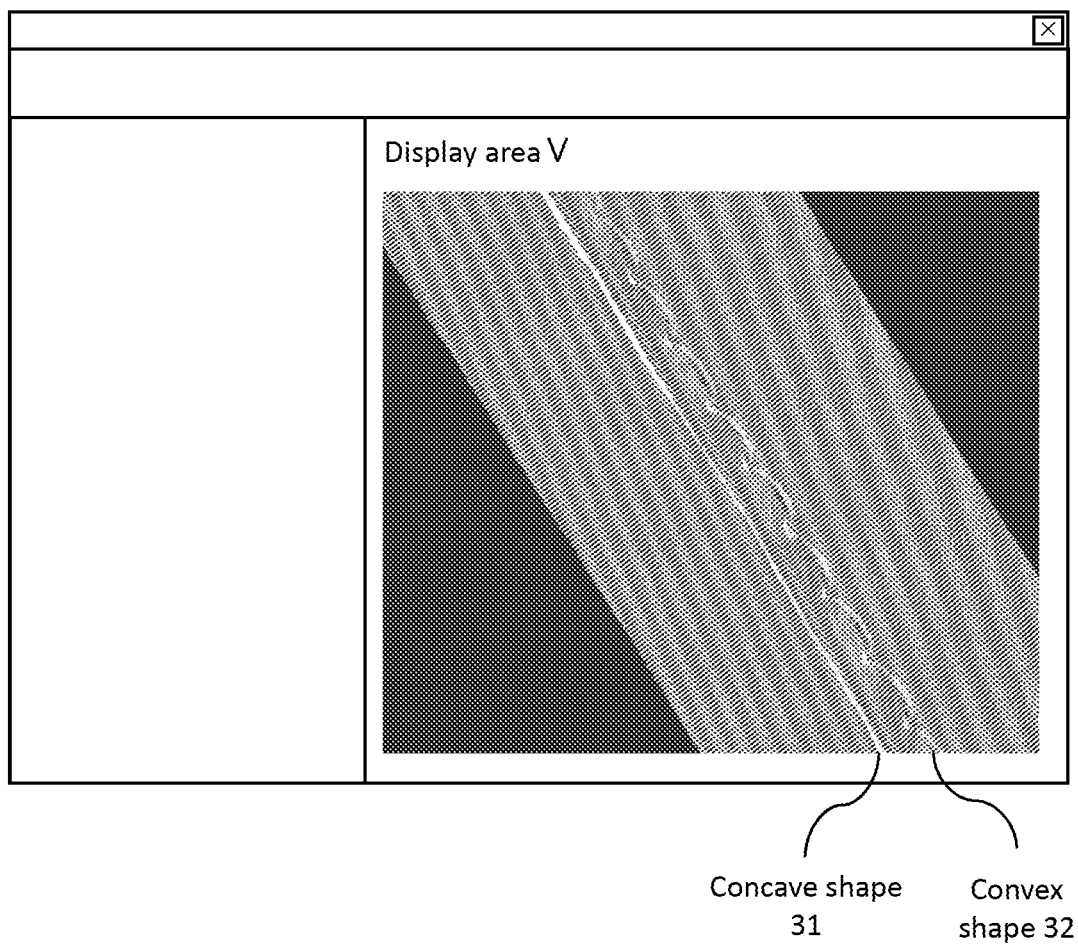
FIG. 4 is showing a display example of the display area V according to the present embodiment.

The sensor 23 senses an object based on a three-dimensional sensor coordinate system. The sensor 23 is, for example, a laser sensor that operates as a three-dimensional scanner, and acquires three-dimensional point group data of an object by sensing. The three-dimensional point group data is, for example, as shown in FIG. 4, and each point data has sensor coordinates, and the shape of the object can be grasped from the point group.

Further, more specifically, the robot coordinate system, the tool coordinate system, and the sensor coordinate system may be correlated with each other by performing a predetermined calibration before work, and, for example, the user may specify the position based on the sensor coordinate system, so that the arm 21 and the tool 22 may be controlled based on the corresponding position.

<Function of Terminal 1>

Figure 3:
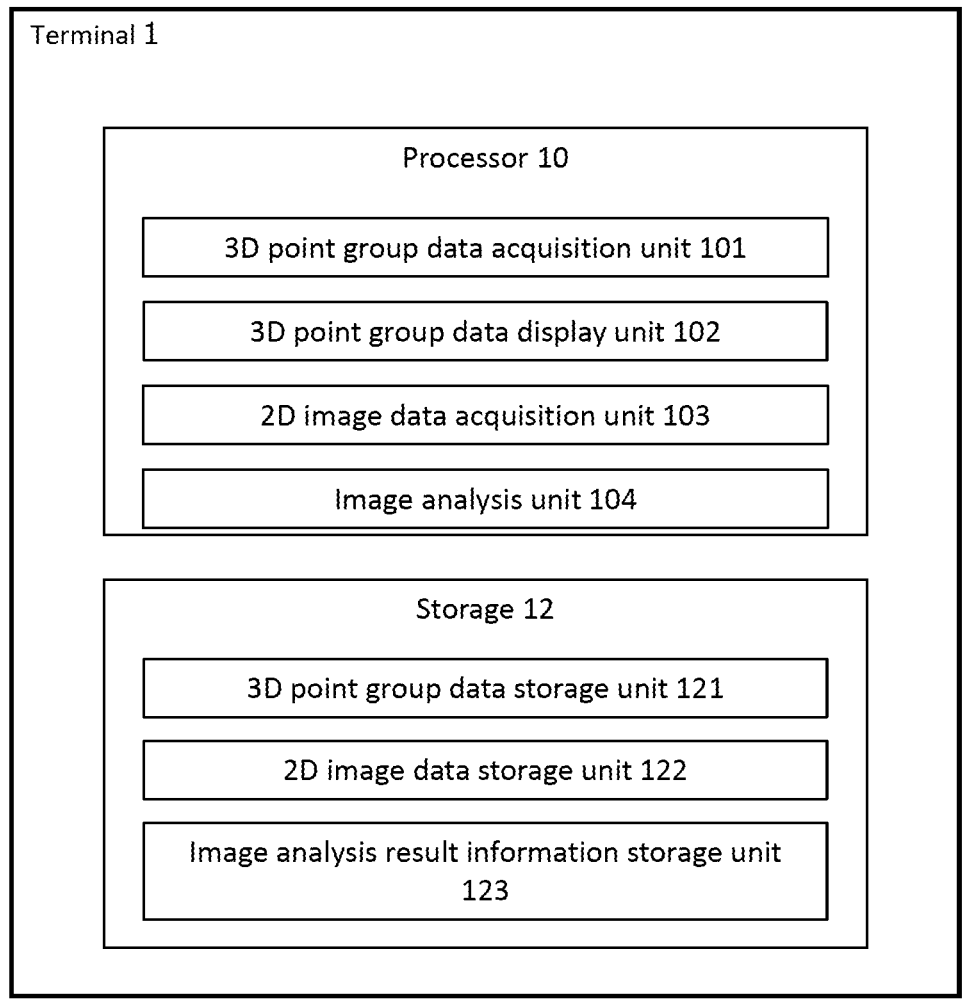
FIG. 3 is showing a functional configuration example of a terminal 1 according to the present embodiment.

FIG. 3 is a block diagram illustrating the functions deployed on the terminal 1. In the present embodiment, the processor 10 of the terminal 1 has a three-dimensional point group data acquisition unit 101, a three-dimensional point group data display unit 102, a two-dimensional image data acquisition unit 103, and an image analysis unit 104. Further, the storage 12 of the terminal 1 has a three-dimensional point group data storage unit 121, a two-dimensional image data storage unit 122, and an image analysis result information storage unit 123.

The three-dimensional point group data acquisition unit 101 controls the working robot 2 in accordance with an instruction from the input/output unit 14 of the terminal 1, and acquires the three-dimensional point group data of the object by a sensor 23. The acquired three-dimensional point group data is, for example, a three-dimensional coordinate information data based on the sensor coordinate system, and is stored in the three-dimensional point group data storage unit 121.

The three-dimensional point group data display unit 102 displays the three-dimensional point group data acquired by the three-dimensional point group data acquisition unit 101 in the display area V, for example, as illustrated in FIG. 4. The user can visually recognize the three-dimensional point group data displayed in the display area V from an arbitrary direction, and for example, can specify the arbitrary direction with an information input device such as a keyboard and a mouse and the like connected to the input/output unit 14.

Figure 5:
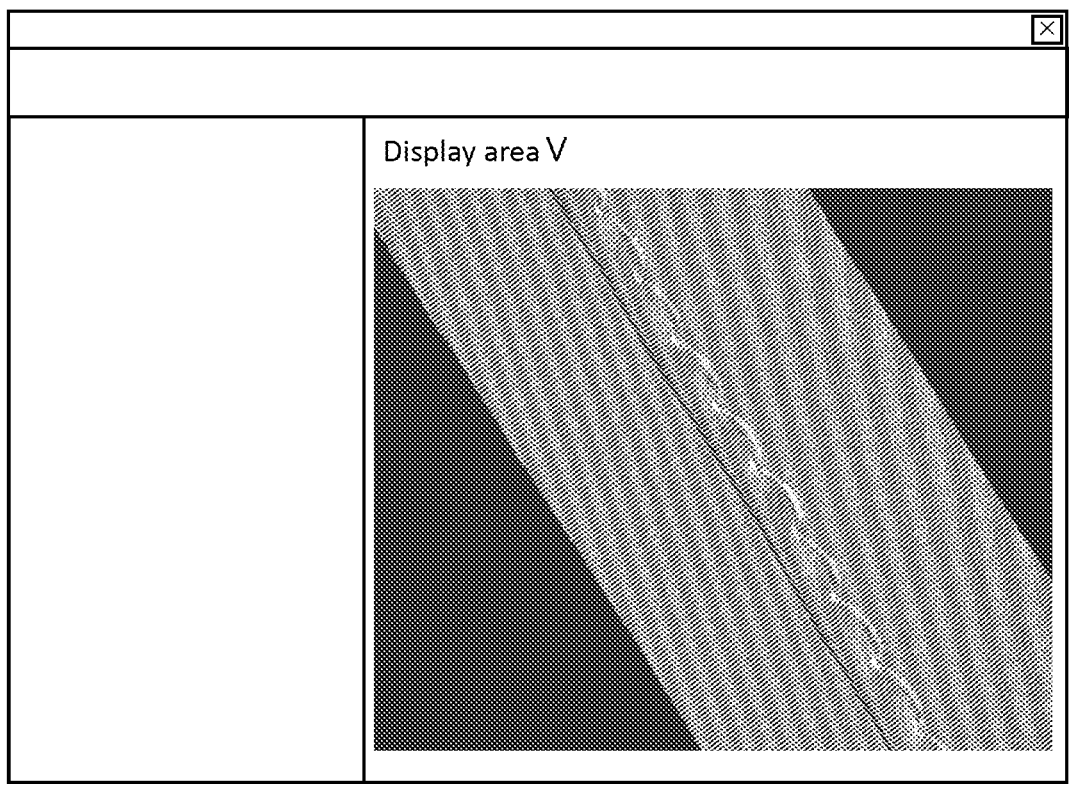
FIG. 5 is showing a display example of the display area V according to the present embodiment.

Further, based on the coordinate data (for example, two-dimensional coordinates on the two-dimensional image data) that constitutes a predetermined shape detected by the image analysis unit 104 described later, the three-dimensional point group data display unit 102 displays the predetermined shape in the display area V so that the predetermined shape can be recognized, for example, as shown in FIG. 5 (for example, it performs coloration with red or the like on the white portion of the coordinate data portion forming the predetermined shape on the display area V). The user can visually recognize the three-dimensional point group data displayed in the display area V from an arbitrary direction, and for example, can specify the arbitrary direction with an information input device such as a keyboard and a mouse and the like connected to the input/output unit 14.

The two-dimensional image data acquisition unit 103 acquires the display of the display area V as two-dimensional image data as in a so-called screenshot. The acquired two-dimensional image data is general-purpose image data such as bitmap data, and is stored in the two-dimensional image data storage unit 122.

The image analysis unit 104 analyzes the two-dimensional image data acquired by the two-dimensional image data acquisition unit 103 under a predetermined condition, and detects a predetermined shape specified by the predetermined condition. Then, the coordinate data (for example, the two-dimensional coordinate on the two-dimensional image data) constituting the predetermined shape is stored in an image analysis result information storage unit 123. The predetermined condition is, for example, to determine that the size and length of the feature points of a predetermined color generated by densely packing the point groups having predetermined colors are equal to or larger than a predetermined value.

Figure 6:
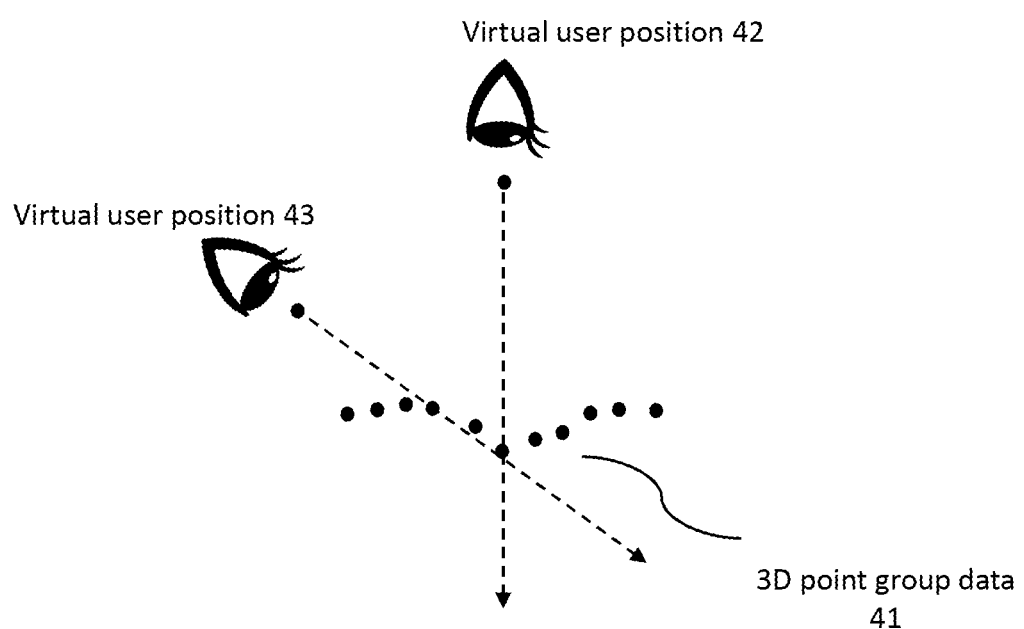
FIG. 6 is for explaining the feature points of three-dimensional point group data according to the present embodiment.

Here, regarding a state in which point groups having predetermined colors are densely packed, for example, in the field of metal processing and the field of resin molding, the description will be given based on the case of confirming the three-dimensional point group data obtained by performing a three-dimensional scan on an object that may have a minute concave shape (so-called sink mark) caused by molding shrinkage of the material. For example, when confirming the three-dimensional point group data 41 from the virtual user position 42 in FIG. 6, since about one point data can be seen as a whole, the degree of density is almost uniform and the feature points do not exist. On the other hand, when confirming the three-dimensional point group data 41 from the virtual user position 43 in FIG. 6, since there is a part where two or more point data are densely packed, such a part appears as a feature point. As a result, for example, a white feature portion such as a concave shape 31 and a convex shape 32 in FIG. 4 can be detected by image analysis.

Further, the image analysis unit 104 can detect a boundary shape between the components even when the object is a superposition of two or more components under the same or similar conditions. That is, when a three-dimensional scan is performed on an overlapping structure of two or more components, point group data such as a kind of concave shape can be acquired for the boundary shape, so that the boundary shape between the components can be detected by the image analysis in the same way as described above.

Further, the image analysis unit 104 can also detect the end face and the edge of the object under the same or similar conditions. That is, since point group data such as a kind of convex shape can be acquired for the end face and edge of the object, the end face and edge of the object can be detected by the image analysis in the same manner as described above.

Further, the image analysis unit 104 learns the relationship between the three-dimensional point group data and a part where a predetermined shape (feature part) such as a concave shape, a boundary shape, or a convex shape is likely to appear, through machine learning or deep learning, and thus, it may be possible to detect a predetermined shape on the two-dimensional image data through image analysis only by a user designating a predetermined shape.

<Flowchart of Shape Detection Method>

Figure 7:
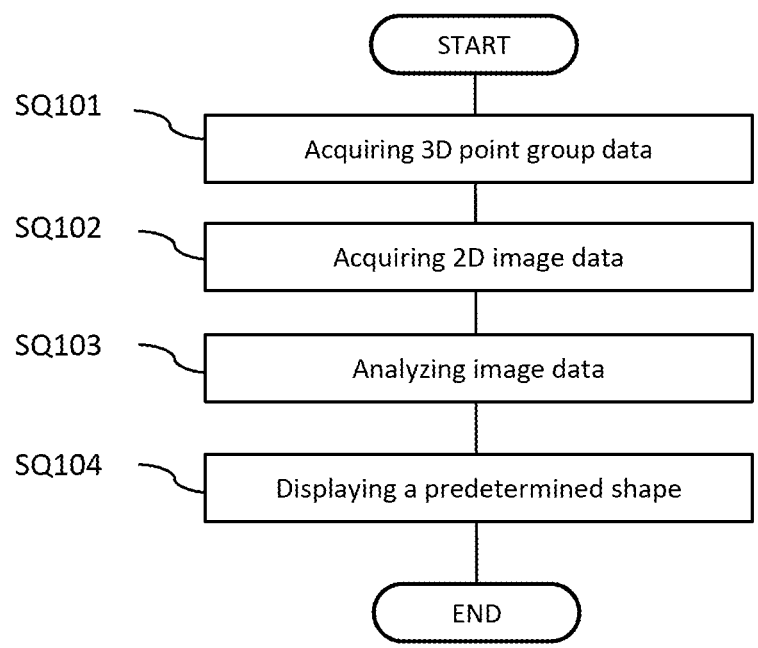
FIG. 7 is a diagram showing a flowchart example of a shape detection method according to the present embodiment.

FIG. 7 is a flowchart of a shape detection method in the shape detection system 100 of the present embodiment.

First, the user operates the working robot 2 by the terminal 1 or a controller (not shown), and acquires three-dimensional point group data of the object located on a work table, for example, by the sensor 23 (SQ101), based on the control by the three-dimensional point group data acquisition unit 101 of the terminal 1.

Next, the three-dimensional point group data acquired by the three-dimensional point group data display unit 102 is displayed in the display area V, and the image data of the display area V is acquired by a two-dimensional image data acquisition unit 103 (SQ102).

Next, the two-dimensional image data acquired by the image analysis unit 104 makes an image analysis under predetermined conditions to detect a predetermined shape specified by a user (SQ103).

Next, based on the detected coordinate data (for example, two-dimensional coordinate on two-dimensional image data) that constitutes the predetermined shape, the three-dimensional point group data display unit 102 displays the predetermined shape on the display area V so that the predetermined shape can be recognized (SQ104).

Therefore, since the predetermined shape on the object can be detected only by performing analysis of the two-dimensional image data, the shape detection system 100 of the present embodiment can easily and quickly detect the predetermined shape on an object.

In addition, considering that the image analysis result is reflected based on the two-dimensional coordinate on the two-dimensional image data acquired at the step of acquiring the two-dimensional image data (SQ102), for example, the size of the display area V can be stored when acquiring two-dimensional image data, and thus, even if the size of the display area V is changed after image analysis, the size of the current display area V (and/or its two-dimensional coordinates) can be correlated with the size of the display area V (and/or its two-dimensional coordinates) at the time of acquiring two-dimensional image data, thereby being able to reflect the result. Further, the size of the display area V may be set so as not to be changeable, at least after the image data is acquired.

Other Embodiment 1

In the shape detection system 100 described above, the predetermined shape is displayed so as to be recognizable on the display area V, based on the coordinate data (for example, two-dimensional coordinate on the two-dimensional image data) that constitutes the predetermined shape obtained as the image analysis result. In addition to (or instead of) this, the three-dimensional point group data display unit 102 may correlate the predetermined position of the two-dimensional coordinate system on the display area V and the predetermined position of the three-dimensional coordinate system of the three-dimensional point group data by recognizing from which direction the user is viewing the three-dimensional point group data and which three-dimensional point group data is displayed in which position on the display area V, and reflect the image analysis result on the three-dimensional point group data.

Figure 8:
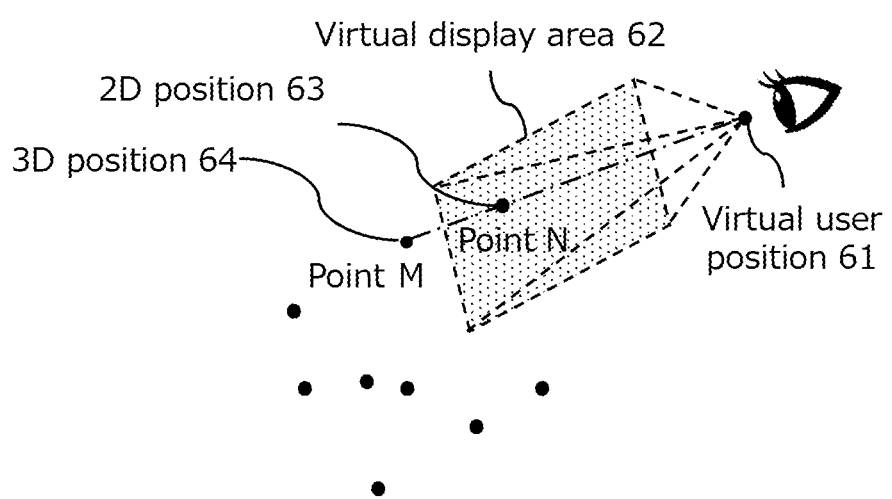
FIG. 8 is illustrating the function of the other shape detection system of the present embodiment.

More specifically, for example, referring to FIG. 8, the arbitrary direction specified by the user is the direction from a virtual user position 61, and a flat area within a predetermined range at a position that is advanced a predetermined length in the arbitrary direction from the virtual user position 61 is defined as the virtual display area 62, which is displayed in the display area V. Then, for example, a virtual straight line (one-dot chain line in FIG. 8) is drawn from the virtual user position 61 to the two-dimensional position 63 where a certain point N in the virtual display area 62 is located, and the virtual straight line is extended to obtain the point M that first intersects in the three-dimensional point group data, and the correspondence relationship between the coordinates of the point M and the point N may be stored.

After that, when the coordinate data constituting the predetermined shape on the two-dimensional image data is obtained by the image analysis of the image analysis unit 104, the corresponding point data in the three-dimensional point group data may be detected by using the above-mentioned correspondence relation, and the point data may be displayed to be confirmed by coloring or the like on the display area V.

By such a configuration, the analysis result displayed on the display area V is not limited to the two-dimensional image data at the time of image analysis, and for example, the predetermined shape can be confirmed on the display area V even when the arbitrary direction is specified by an information input device such as a keyboard or a mouse or the like connected to the input/output unit 14.

In addition, the processor 10 can particularly grasp the length between the analyzed arbitrary points on the three-dimensional point group data or the display area V. This also makes it possible to grasp the length between the positions that the user wants to recognize, and for example, when the predetermined shape is a concave shape such as a groove, it is possible to confirm the length and width between the concave shapes.

Other Embodiment 2

The above-mentioned shape detection method is particularly useful for determining whether the shape does not satisfy the standard for a plurality of objects. That is, by storing from which direction (virtual user position) the point group data can be confirmed for an object having a shape that does not satisfy the standard (for example, a concave shape 31 appears in a predetermined part), it is possible to detect the feature parts by image analysis. In this way, it can be easily confirmed whether all the objects are not in shapes that do not satisfy the same standard.

Other Embodiment 3

The above-mentioned shape detection method is particularly useful for determining whether the shape satisfies the standard for a plurality of objects. That is, the virtual user position is set and stored in a plurality of directions around the object so that it can be confirmed whether the shape satisfies the standard, and the analysis results of the images obtained from these directions are compared with the image analysis results of those that satisfy the standard, and thus, for example, it may be determined whether there is a shape deformation or scratch.

Although the present embodiment has been described above, the above-described embodiment is merely an example for facilitating the understanding of the present invention, and should not be construed as limiting the present invention. The present invention can make some modifications and improvements without departing from the spirit thereof, and the present invention includes an equivalent thereof.

DESCRIPTION OF REFERENCE NUMERALS

1: terminal
2: working robot
21: arm
22: tool
23: sensor

The invention claimed is:

1. A shape detection method for detecting a shape of an object, the method comprising:
    acquiring data indicating three-dimensional point group data from the object by a sensor;
    displaying the three-dimensional point group data in a display area of a terminal;
    acquiring the display area, in which the three-dimensional point group data is displayed, as two-dimensional image data; and
    performing image analysis on the two-dimensional image data to determine whether size or length of feature points of a predetermined color generated by densely packing point groups within the two-dimensional image data is equal to or greater than a predetermined value, and detecting a predetermined shape of the object based on an image analysis result.

2. The shape detection method as set forth in claim 1, wherein displaying the three-dimensional point group data comprises:
    generating display data based on data indicating a three-dimensional shape and displaying the display data in the display area of the terminal.

3. The shape detection method as set forth in claim 1, further comprising: storing size of the display area when acquiring the two-dimensional image data.

4. The shape detection method as set forth in claim 1, further comprising:
    prohibiting a change in size of the display area after acquiring the two-dimensional image data.

5. The shape detection method as set forth in claim 1, wherein acquiring the display area is performed based on a virtual user position specified by a user, and wherein performing the image analysis on the two-dimensional image data comprises:
    acquiring the image analysis result by performing the image analysis on the two-dimensional image data; and
    comparing the image analysis result with a standard image analysis result to determine whether the image analysis result satisfies a standard.

6. The shape detection method as set forth in claim 1, wherein a two-dimensional coordinate of the two-dimensional image data is correlated with a three-dimensional coordinate of the three-dimensional point group data, and
wherein the method further comprises displaying a position of the predetermined shape in the display area so as to be graspable on the three-dimensional point group data of the object.

7. The shape detection method as set forth in claim 1, wherein the predetermined shape is a concave shape of the object.

8. The shape detection method as set forth in claim 1, wherein the predetermined shape is a convex shape of the object.

9. The shape detection method as set forth in claim 1, wherein the object is an overlap of two or more components, and the predetermined shape is a boundary shape between the two or more components.

10. The shape detection method as set forth in claim 1, further comprising:
    measuring length between arbitrary positions on the two-dimensional image data.

11. A shape detection system for detecting a shape of an object, the system comprising:
    a three-dimensional point group data acquisition unit that acquires three-dimensional point group data from the object by a sensor;
    a three-dimensional point group data display unit that displays the three-dimensional point group data in a display area of a terminal;
    a two-dimensional image data acquisition unit that acquires the display area, in which the three-dimensional point group data is displayed, as two-dimensional image data; and
    an image analysis unit that performs image analysis on the two-dimensional image data to determine whether size or length of feature points of a predetermined color generated by densely packing point groups within the two-dimensional image data is equal to or greater than a predetermined value, and that detects a predetermined shape of the object based on an image analysis result.

12. The shape detection system as set forth in claim 11, wherein the three-dimensional data display unit generates display data based on data indicating a three-dimensional shape and displays the display data in the display area of the terminal; and
wherein the two-dimensional image data acquisition unit acquires the display data as the two-dimensional image data.

13. The shape detection system set forth in claim 11, wherein the system stores size of the display area when acquiring the two-dimensional image data.

14. The shape detection system set forth in claim 11, wherein the system prohibits a change in size of the display area after acquiring the two-dimensional image data.

15. The shape detection system set forth in claim 11,
wherein the two-dimensional image data acquisition unit acquires the display area, in which the three-dimensional point group data is displayed, based on a virtual user position specified by a user, and
wherein the image analysis unit acquires the image analysis result by performing the image analysis on the two-dimensional image data, and
compares the image analysis result with a standard image analysis result to determine whether the image analysis result satisfies a standard.

16. A non-transitory computer-readable medium having computer-executable codes stored thereon, which, when executed by a processor, make a computer execute a shape detection method for detecting a shape of an object, the shape detection method, comprising:
acquiring data indicating three-dimensional point group data from the object by a sensor;
displaying the three-dimensional point group data in a display area of a terminal;
acquiring the display area, in which the three-dimensional point group data is displayed, as two-dimensional image data; and
performing image analysis on the two-dimensional image data to determine whether size or length of feature points of a predetermined color generated by densely packing point groups within the two-dimensional image data is equal to or greater than a predetermined value, and detecting a predetermined shape of the object based on an image analysis result.

17. The non-transitory computer-readable medium set forth in claim 16, wherein displaying the three-dimensional point group data comprises:
generating display data based on data indicating a three-dimensional shape and displaying the display data on the display area of the terminal.

18. The non-transitory computer-readable medium set forth in claim 16,
wherein the shape detection method further comprises storing size of the display area when acquiring the two-dimensional image data.

19. The non-transitory computer-readable medium set forth in claim 16,
wherein the shape detection method further comprises prohibiting a change in size of the display area after acquiring the two-dimensional image data.

20. The non-transitory computer-readable medium set forth in claim 16,
wherein acquiring the display area is performed based on a virtual user position specified by a user, and
wherein performing the image analysis on the two-dimensional image data comprises:
acquiring the image analysis result by performing the image analysis on the two-dimensional image data; and
comparing the image analysis result with a standard image analysis result to determine whether the image analysis result satisfies a standard.

* * * * *